Feb. 25, 1964 H. MEESEN 3,122,259
TANKER FOR LIQUID GAS
Filed Aug. 30, 1960 6 Sheets-Sheet 1
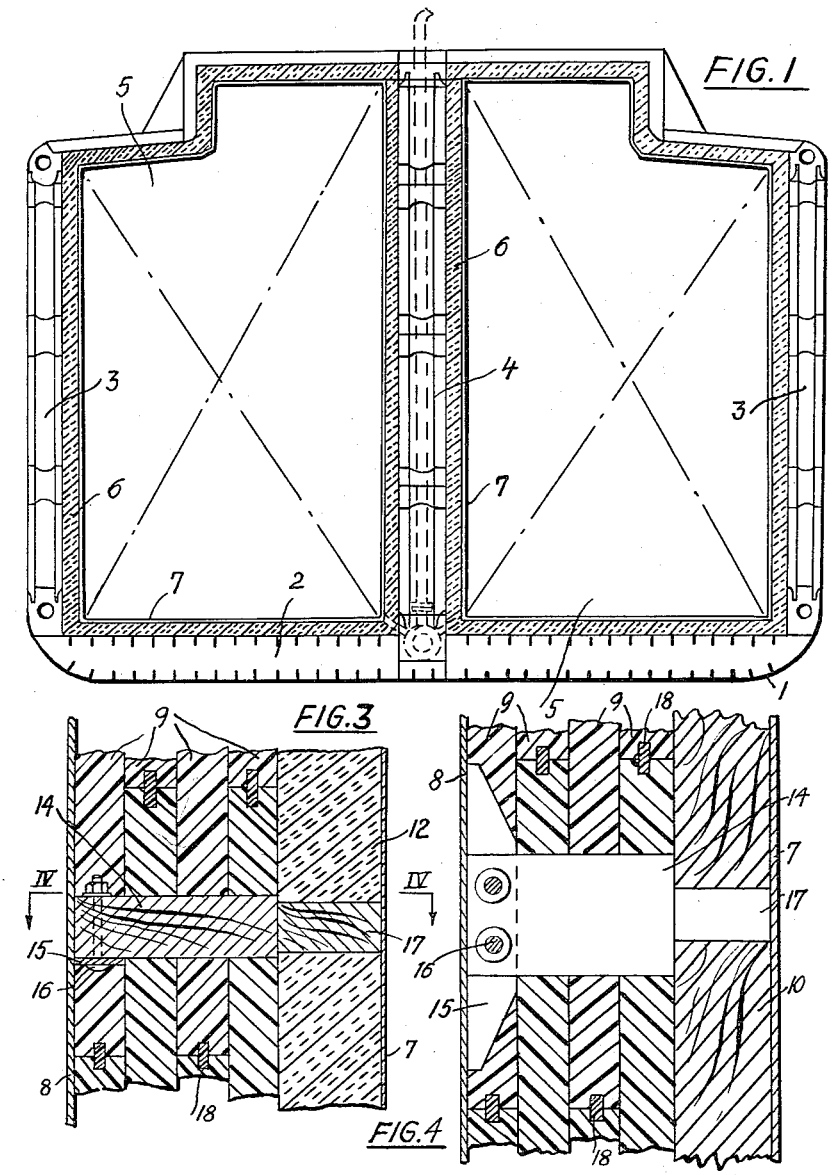
INVENTOR
Heinrich Meesen
ATTYS.

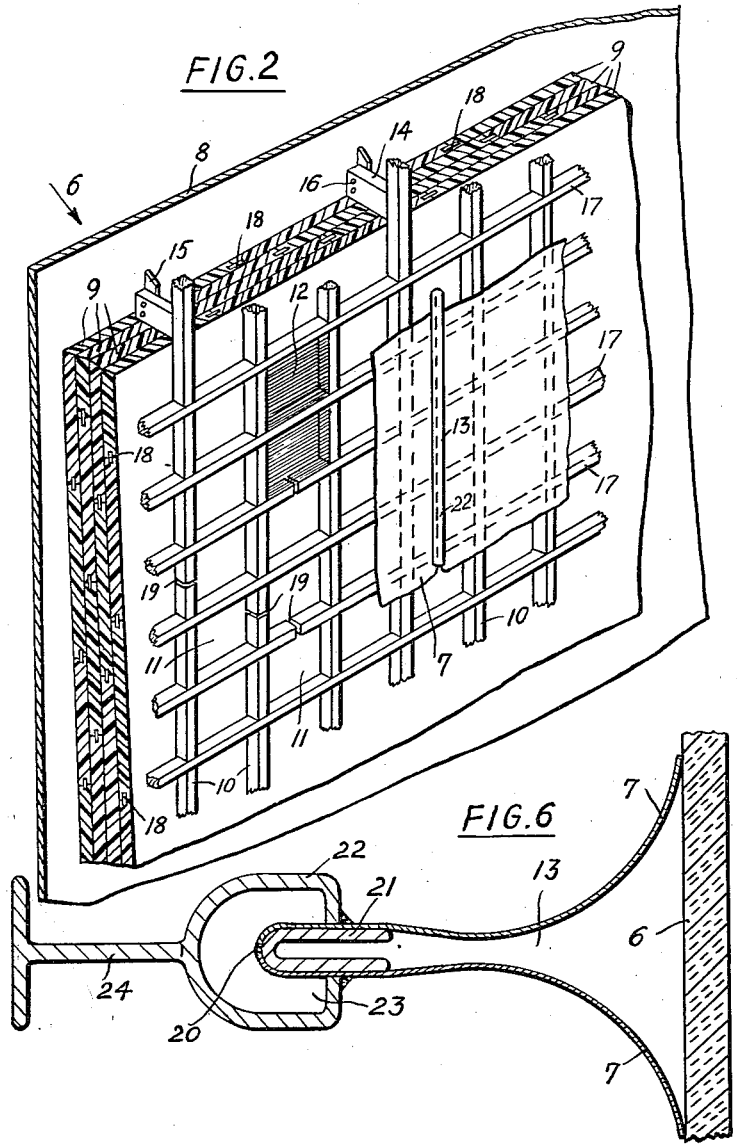

Feb. 25, 1964   H. MEESEN   3,122,259
TANKER FOR LIQUID GAS
Filed Aug. 30, 1960   6 Sheets-Sheet 3
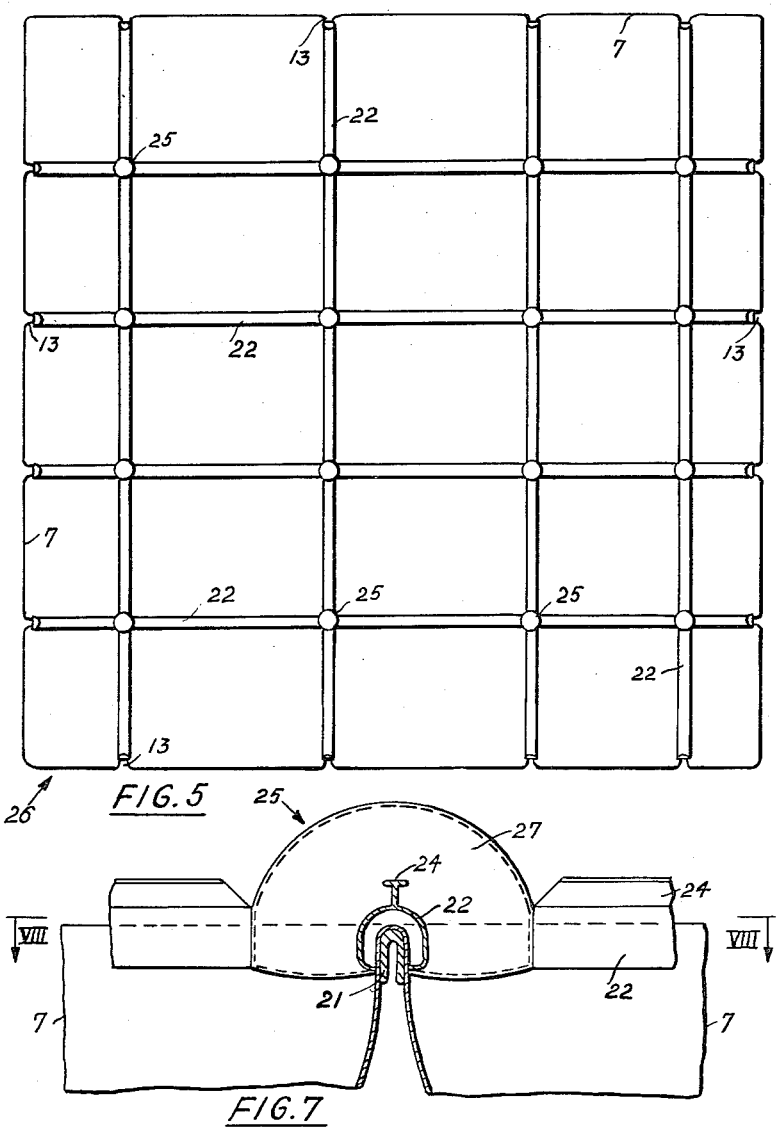

Feb. 25, 1964 H. MEESEN 3,122,259
TANKER FOR LIQUID GAS
Filed Aug. 30, 1960 6 Sheets-Sheet 4
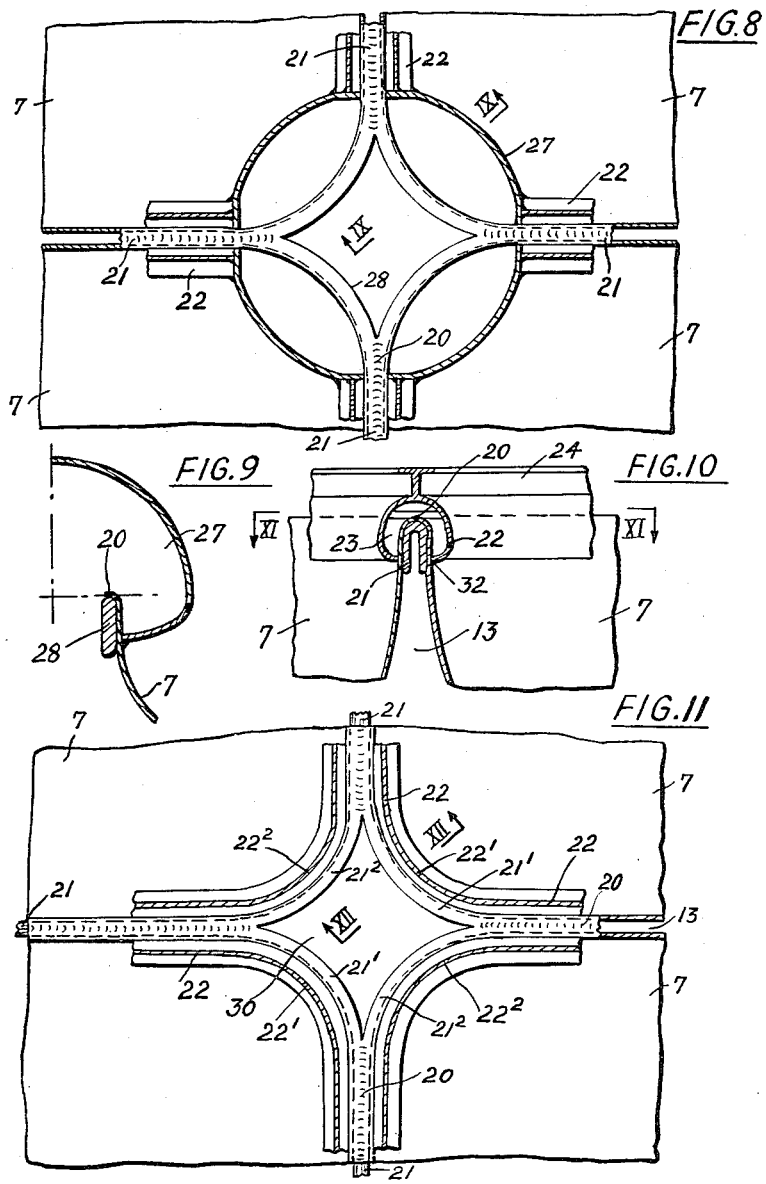
INVENTOR
Heinrich Meesen
By
Lowry & Rinehart
ATTYS.

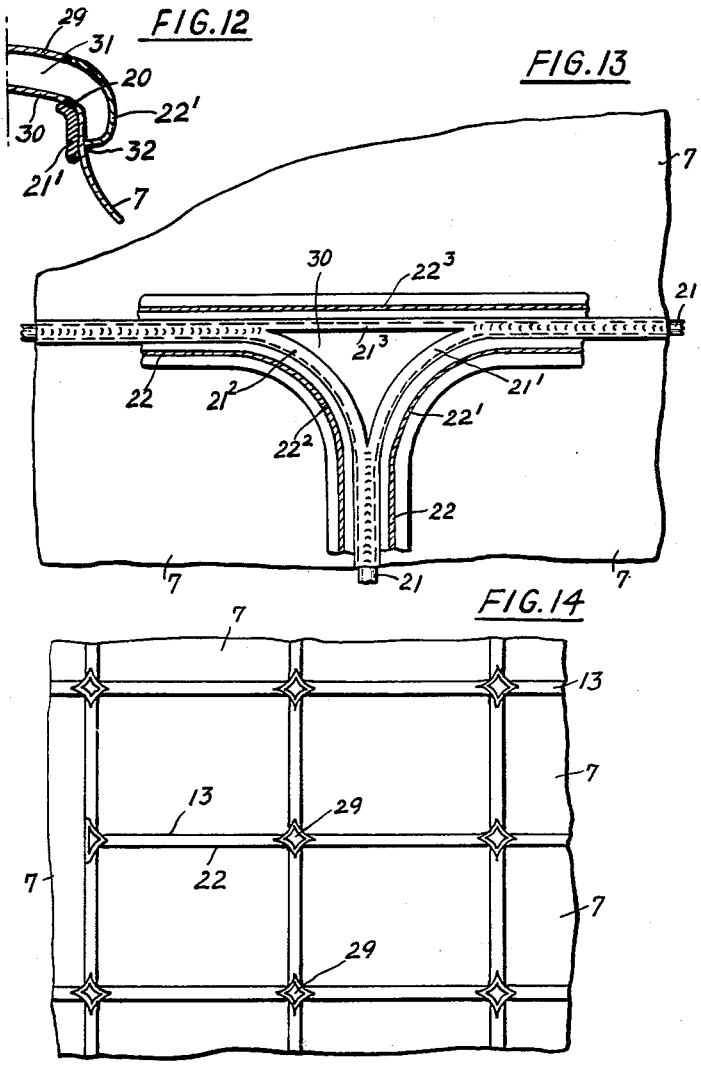

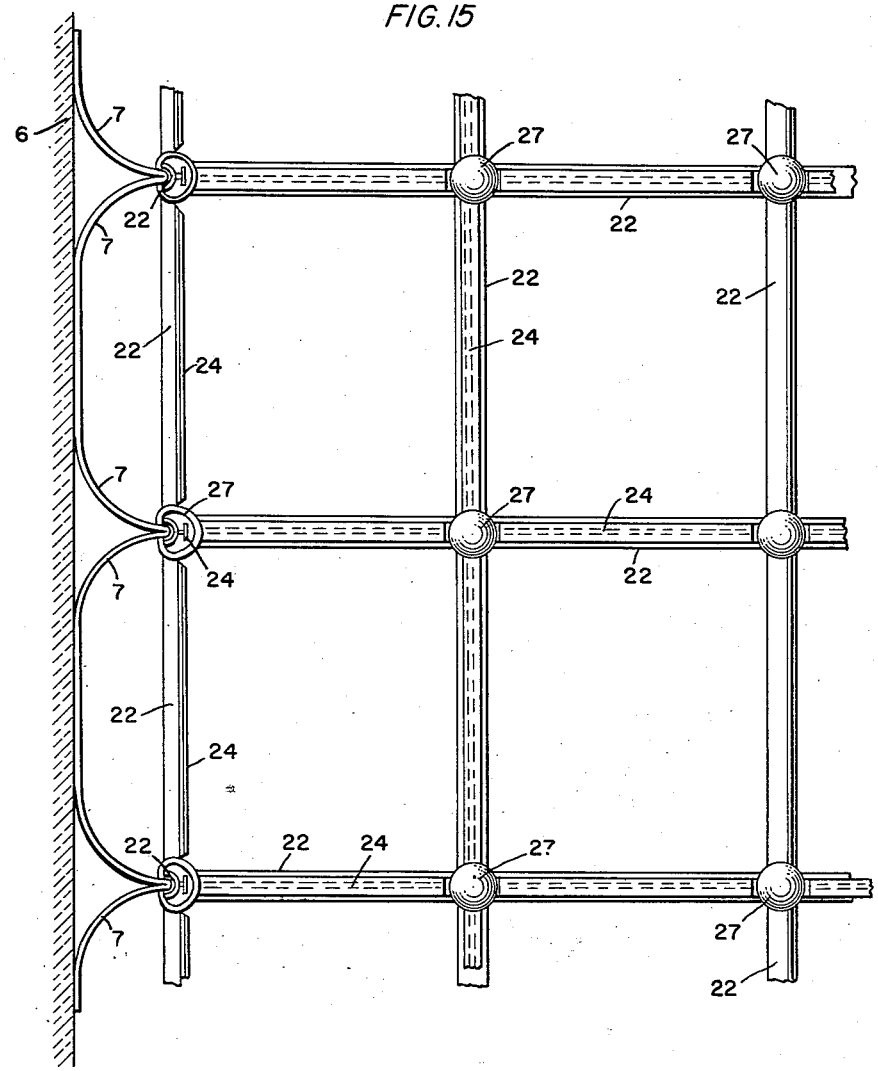

United States Patent Office 3,122,259
Patented Feb. 25, 1964

3,122,259
TANKER FOR LIQUID GAS
Heinrich Meesen, Kiel-Ellerbek, Germany, assignor to Kieler Howaldtswerke A.G., Kiel-Dietrichsdorf, Germany, a firm
Filed Aug. 30, 1960, Ser. No. 52,911
Claims priority, application Germany Sept. 10, 1959
3 Claims. (Cl. 220—15)

It is known to liquefy gases for transport by the extraction of heat and to fill these gases into insulated tanks anchored in the freight room of a tanker. As, during the filling in of the liquefied gases, the walls of the tanks contract to a considerable degree due to the low temperatures of these gases (boiling point of methane $CH_4 = -161.4°$) difficulties are encountered in the anchoring of the tanks in the hull of the tanker. It has been attempted to arrange anchorings concentrically to one of the centroidal axes of each tank, which form no heat bridges. These anchorings, partly by pins, effect a loosening of the tank in the hull of the tanker at very low temperatures. The necessary reinforcements in the interior of the tank are also subjected to shrinkage stresses.

It is also known to arrange insulated tanks for liquefied gas alternating with oil tanks in the hull of the tanker, in such a manner that the oil tanks are disposed around the tanks for liquefied gas arranged amidships, so as to reinforce the tanker. The oil tanks surround the tanks for liquefied gas and are arranged between them in sheet pile bulkhead-fashion. The transport of liquefied gases, such as methane, with low temperatures is, however, not possible with the known gas tanks because the shrinkage of the walls of the tanks for liquefied gas is not taken into consideration and the shrinkage of the tanks in the hull of the tanker can effect the formation of cold bridges which may lead to cracks in the hull of the tanker due to the cold-shortness of the shipbuilding steel.

To overcome these disadvantages, to utilize to best advantage the tank of the tanker, to keep the stresses of the tanker away from the tanks for liquefied gas and prevent transmission of the shrinkages of the gas tanks to the hull of the tanker, as well as, in the case of a crack in the insulation of the gas tanks, to prevent the cold from penetrating the hull of the tanker on account of the cold-shortness thereof, the invention provides a tanker for transporting liquid gases in insulated freight rooms, which comprises a double bottom, longitudinal and transverse bulkheads, insulated tanks for the liquid gas rigidly arranged between said double bottom and said longitudinal and transverse bulkheads constructed in sheet pile bulkhead-fashion, said tanks being formed by an insulating layer connected to the walls of the tanker and said bulkheads and composed of a material selected from the group consisting of synthetic resin foam material, thermoplastic synthetic material, balsa wood, cork, glass fibres, and foam glass, and a light metal skin with expansion joints arranged on the insulating layer on the side facing the gas.

The liquefied gas is separated from the synthetic foam insulation by the gas-tight light metal skin. The light metal skin ensures a constant engagement with the inner insulation in the case of shrinkage.

In order to reliably prevent an effective passage of cold to the steel tank wall even in the case of different shrinkage between the insulation and the light metal skin and to produce an elastic insulation in which no cold bridges can occur even by gap widenings in the case of shrinkage, several insulating layers of polystyrene foam slabs are arranged on the inner steel sides of the tank walls, at least the inner layer being formed of slabs with tongue and groove connection. A framework composed of balsa wood with expansion gaps extends from the polystyrene foam layers, and the intermediate spaces in the framework are filled to the thickness of the balsa wood with a prestressed elastic filler of spun glass or the like. A gastight light metal skin with expansion joints engages the balsa wood framework, which is supported against the tank wall by separate horizontal distance or spacer supports connected to the tank wall by straps.

Gap widenings between the insulating slabs on the cold inner side, which would involve a loss of insulating effect, are avoided by the elastic insulation which is applied in sufficient thickness on the polystyrene foam insulation. As the elastic insulation cannot take up the liquid pressure acting upon the light metal skin, the balsa wood framework is for this purpose provided with preferably square fields in the plane of the elastic insulation, on which fields the elastic insulation is placed at the edges with initial stress. The balsa wood framework has parting lines which take its shrinkage into consideration. The bracing of the balsa wood framework on the steel tank wall is effected by balsa wood spacer supports at a distance determined for the pressure.

According to another feature of the invention the expansion joints at the connection seams of the light metal skin are surrounded by tubular hollow bodies the interior of which is constructed as a testing space, the testing being carried out by subjecting the space to the influence of pressure.

The expansion joints are guided with their welding seams over a rounded section which engages in the tubular hollow body. The tubular hollow bodies can be interconnected by sectional reinforcing members.

Special corner and cross connections are provided for the tubular hollow bodies and their reinforcements, if any. The tanks for liquefied gas can fill the entire freight rooms. It is, however, also possible to provide partly oil tanks and partly liquid gas tanks. The gas tanks are equipped in a known manner with safety valves with connection to a waste gas conduit leading to the mast. Conduits for liquid, temperature measuring installations and direction-finder apparatuses as well as the pumps are present in a known manner. When, for safety reasons, the gas tanks are arranged between the double bottom and the lateral longitudinal and transverse bulkheads constructed as sheet pile bulkheads, the control instruments, the pumps and the access to the double bottom cells can be accommodated in the hollow bodies.

In the case of the corner connections of the light metal skin, especially in the case of the cross and T-connections, a simplified construction is obtained by bisecting the hollow body and the rounded sections in a corner connection in their longitudinal direction, combining half the hollow body and half the rounded section of a longitudinal expansion gap with half the hollow body and half the rounded section of a transverse expansion gap in a curve corresponding to the corner curvature of the skin, and connecting the halves of the hollow body by a plate, and the halves of the section by another plate with the object of closing the testing space.

Then cross connections and T-connections can be obtained selectively, the two plates serving for closing the testing space only receiving different shapes. The plates can be arched.

Several preferred embodiments of the invention will now be described by way of example and with reference to the accompanying drawings, in which:

FIG. 1 is a cross-section through a gas tanker with two gas tanks;
FIG. 2 is a perspective view of the tank insulation;
FIG. 3 is a horizontal cross-section through the insulating layer;
FIG. 4 is a section taken on line IV—IV of FIG. 3;

FIG. 5 shows the position of expansion joints and reinforcements on a wall of the gas tank;

FIG. 6 shows an expansion joint on an enlarged scale;

FIG. 7 shows a corner connection for expansion joints in elevation;

FIG. 8 is a section taken on line VIII—VIII of FIG. 7;

FIG. 9 is a section taken on line IX—IX of FIG. 8;

FIG. 10 is an elevation of a cross connection for the expansion joint;

FIG. 11 is a section taken on line XI—XI of FIG. 10;

FIG. 12 is a section taken on line XII—XII of FIG. 11;

FIG. 13 is a section similar to FIG. 11 through a T-connection for the expansion joint;

FIG. 14 shows the position of the corner connections and expansion joints on a tank wall, and FIG. 15 is a fragmentary plan view, partially in section, disclosing a constructional detail.

Referring to FIG. 1, a tanker 1 constructed with a double bottom 2 and hollow bulkheads 3 and 4 has tanks 5 for liquid gas built in it. An insulating layer 6, for example of synthetic resin foam material, thermoplastic synthetic material, balsa wood, cork, glass fibres, foam glass, or a similar material which repels moisture, completely closes the space receiving the liquefied gas and only allows for the passage of the necessary pipe conduits. The insulating layer 6 is connected with the bulkheads 3 and 4 and the double bottom 2 and prevents the formation of cold bridges. On the side facing the gas the insulating layer 6 has as covering a light metal skin 7 which is applied on the insulating layer 6 by an elastic adhesive or any other suitable means.

As shown in FIGS. 2 to 4, the insulating layer 6 is constructed in such a manner that the inner side of a steel tank wall 8 is engaged by a plurality of polystyrene foam layers 9 which are followed by a balsa wood framework 10. A prestressed elastic filler 12 of spun glass or the like fills intermediate spaces 11 of this framework 10 to the thickness of the balsa wood. The balsa wood framework 10 is engaged by the gas-tight light metal skin 7 having expansion joints 13 and shrinking sections.

The balsa wood framework 10 is braced on the inner side of the tank wall 8 by separate horizontal spacer or distance supports 14. These distance supports 14 are secured to straps 15 of the tank wall 8 by means of bolts 16 and connected to the balsa wood framework 10 by means of copings 17 (FIGS. 3 and 4).

The polystyrene foam layers 9 are composed of individual slabs in each layer and fitted together by splines 18. The balsa wood framework 10 has straight or inclined expansion gaps 19 (FIG. 2).

As can be seen from FIG. 5, the light metal skin 7 is provided with the expansion joints 13 so as to compensate the shrinkage of the light metal when the liquefied gases with their low temperatures are brought into the tanks 5. The boiling point of methane is about −161° C., of ethane −89° C., of propane −42° C., and of butane −10.2° C. Light metal shrinks, for example, about 4 mm. per metre at a temperature change from 20° C. to −161° C. so that with a tank height of 20 metres a shrinkage of about 80 mm. occurs. Therefore, if ten expansion joints 13 are arranged over the height of 20 metres, each joint would have to take up a shrinkage of about 8 mm. In FIG. 5, connections 25 with the shrinkage joints 13 are shown on an inner side wall 26 of the tank. The number of connections 25 depends upon the size of the light metal skin 7.

FIG. 6 shows one expansion joint 13. A welding seam 20 of the light metal skin 7 is produced on a rounded section 21. Each welding seam 20 is preferably surrounded by a tubular hollow body 22 the inner space of which is constructed as a testing space 23, the testing being carried out by subjecting the space to the influence of pressure. It is possible to check at any time with the aid of the hollow bodies 22 whether the welding seam 20 is tight.

The tubular hollow bodies 22 can be interconnected. They are preferably combined in sections. Reinforcing members 24 which are of T-shaped cross section (see FIG. 6) are rigidly secured, as, for example, by welding, to tubular bodies 22, or may alternatively be made in one piece therewith.

Members 24 may be provided at any desired point of hollow bodies 22 where required, and should be provided particularly at the bottom of the tank. When the sides of hollow bodies 22 are subjected to local stresses through ladders, or when frames or racks are installed, they may be secured to members 24, which are in turn secured to the sides of the hollow bodies 22. FIG. 7 discloses a member 24 at a joint. While the members 24 are not directly connected to one another, either laterally or longitudinally, they serve materially to increase the rigidity and strength of the tank.

FIGS. 7 to 9 show the connection 25 for four light metal skins 7. This connection consists of a spherical hollow body 27 to which the rounded sections 21 and the hollow bodies 22 serving as testing spaces are welded or otherwise fixed. The individual rounded sections 21 or solid-walled sections 28 (FIG. 9) extend through the hollow body 27 and are firmly interconnected. As shown in FIG. 9, in the corner of the connection of the expansion joints the light metal skins 7 are fixed on the section 28 by the welding seam 20. The light metal skins are curved in the corner so that a perfect seal is obtained and the light metal skins are capable of shrinking.

FIGS. 10 and 11 show another cross connection at the expansion joint. The welding seam 20 of the light metal skin 7 is produced over the rounded section 21. Each welding seam 20 is surrounded by the tubular hollow body 22 which is welded to the skin at 32 and the internal space of which is constructed as the testing space 23. It can be checked at any time with the aid of the hollow bodies 22 whether the welding seams are tight. The welding seams 20 are tested as to their tightness by X-rays preferably before the hollow bodies 22 are fitted.

The tubular hollow bodies 22 can be interconnected by the sectional reinforcing members 24.

At the cross connections or T-connections the rounded sections 21 as well as the hollow bodies 22 are halved in their longitudinal direction and form, as shown in FIG. 11, portions $21^1$ and $21^2$ and $22^1$ and $22^2$, respectively. The divided rounded sections 21 and the divided hollow bodies 22 extend from the longitudinal expansion gap to the transverse expansion gap in a curve corresponding to the corner curvature of the skin 7.

In the case of a cross connection all portions $21^1$, $21^2$, $22^1$ and $22^2$ reunite, as can be seen from FIG. 11, whereas in the case of a T-connection shown in FIG. 13 one half $22^3$ of the hollow body 22 and one half $21^3$ of the rounded section 21 extend in a straight line in the longitudinal expansion gap.

At the connection point plates 29 and 30 (FIG. 12) are provided for reestablishing the testing space which is interrupted by the bisection of the hollow bodies 22. The plate 29 connects the hollow body portions $22^1$ and $22^2$ and the plate 30 connects the section portions $21^1$ and $21^2$. A hollow space 31 so formed can then be subjected to testing pressure in conjunction with the testing space 23. The two plates 29 and 30 can be arched and are welded to the sections. In the case of a cross connection the plates 29 and 30 are of square configuration with inwardly curved or concave edges (FIG. 14). In the case of a T-connection the plates 29 and 30 are of triangular configuration with two inwardly curved or concave edges.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of

I claim:
1. A tank construction for ships and like transports comprising rigid outer tank walls, an inner light metal skin spaced from said tank walls and an insulation assembly completely filling the space between said metal skin and said tank walls, said insulation assembly comprising insulating layers composed of polystyrene foam slabs arranged on the inner sides of the tank walls, at least the inner one of said layers being formed of slabs interconnected by spline strips received in grooves in the slabs, a framework of balsa wood with expansion gaps extending from said insulating layers, the intermediate spaces of said framework being filled to the thickness of the balsa wood with a prestressed elastic filler of spun glass, and said light metal skin engaging said balsa wood framework, separate horizontal distance supports bracing said balsa wood framework on the tank wall, and straps connecting said supports to the tank wall.

2. The tank construction of claim 1 wherein said metal skin is formed of a plurality of sheets connected together along the edges thereof by expansion joints disposed inwardly of said sheets and entirely free of said insulation assembly.

3. A tank as claimed in claim 2, wherein the expansion joints are connected to the light metal skin by welding seams and surrounded by tubular hollow bodies the internal space of which is constructed as a test pressure space.

References Cited in the file of this patent
UNITED STATES PATENTS

| | | |
|---|---|---|
| 1,902,110 | Urich | Mar. 21, 1933 |
| 1,954,581 | Wortman | Apr. 10, 1934 |
| 2,859,895 | Beckwith | Nov. 11, 1958 |
| 2,889,953 | Morrison | June 9, 1959 |
| 2,896,416 | Henry | July 28, 1959 |
| 2,911,125 | Dosker | Nov. 3, 1959 |
| 2,963,873 | Stowers | Dec. 13, 1960 |
| 2,983,401 | Murphy | May 9, 1961 |
| 3,030,669 | Dosker | Apr. 24, 1962 |

FOREIGN PATENTS

| | | |
|---|---|---|
| 329,878 | Italy | Sept. 26, 1935 |
| 1,200,239 | France | June 29, 1959 |